(12) United States Patent
Polyakov

(10) Patent No.: US 11,408,563 B1
(45) Date of Patent: Aug. 9, 2022

(54) PRESSURE VESSEL AND METHOD OF MANUFACTURING THEREOF

(71) Applicant: PIPL LIMITED, Nicosia (CY)

(72) Inventor: Maxym Polyakov, Edinburgh (GB)

(73) Assignee: PIPL LIMITED, Nicosia (CY)

( * ) Notice: Subject to any disclaimer, the term of this patent is extended or adjusted under 35 U.S.C. 154(b) by 0 days.

(21) Appl. No.: 17/674,077

(22) Filed: Feb. 17, 2022

(51) Int. Cl.
  *F17C 13/00* (2006.01)
  *B33Y 80/00* (2015.01)
  *B33Y 70/00* (2020.01)

(52) U.S. Cl.
  CPC .......... *F17C 13/002* (2013.01); *B33Y 70/00* (2014.12); *B33Y 80/00* (2014.12); *F17C 2201/0128* (2013.01); *F17C 2201/0142* (2013.01); *F17C 2203/0614* (2013.01); *F17C 2203/0648* (2013.01); *F17C 2209/2109* (2013.01); *F17C 2221/011* (2013.01); *F17C 2221/014* (2013.01); *F17C 2221/017* (2013.01)

(58) Field of Classification Search
  CPC ........ B65D 88/04; B33Y 70/00; B33Y 80/00; F17C 13/002; F17C 13/00
  USPC .................. 220/581, 675, 669, 560.09; 206/6
  See application file for complete search history.

(56) References Cited

U.S. PATENT DOCUMENTS

| | | | |
|---|---|---|---|
| 2,171,973 A * | 9/1939 | Debor | F17C 1/00 220/563 |
| 2,329,765 A * | 9/1943 | Jackson | F17C 3/08 62/46.1 |
| 2,845,199 A * | 7/1958 | Putman | F17C 3/08 220/560.11 |

(Continued)

FOREIGN PATENT DOCUMENTS

EP          552915 A1 *  7/1993 ............... F17C 1/00

*Primary Examiner* — Robert J Hicks
(74) *Attorney, Agent, or Firm* — Georgiy L. Khayet

(57) ABSTRACT

Provided is a pressure vessel. An example pressure vessel includes a spherical portion and a conical portion that extends from the spherical portion and has an opening for pumping in and pumping out a pressurized gaseous substance. The spherical portion and the conical portion are made in a single technological cycle by 3D printing. The thicknesses of the wall of the spherical portion changes from $$\delta_1 = \frac{PR_1}{2[\sigma]}$$

to $$\delta_2 = \frac{\sqrt{3}\,PR_2}{2[\sigma]\cos\alpha}$$

and the thickness of the wall of the conical portion changes linearly from $\delta_2$ to $$\delta_3 = \frac{\sqrt{3}\,PR_3}{2[\sigma]\cos\alpha},$$

where P is predetermined operating pressure, $R_1$ is a radius of the spherical portion, $R_2$ is a radius of a base of the conical portion, $R_3$ is a radius of the opening of the conical portion, $[\sigma]$ is an allowable material stress, and a is an angle between a generatrix and a symmetry axis of the conical portion.

20 Claims, 2 Drawing Sheets

(56) References Cited

U.S. PATENT DOCUMENTS 2,901,592 A  *   8/1959   Rossheim .................. B01J 3/04
                                                       219/137 R
3,633,780 A  *   1/1972   Rausing ................. B65D 25/00
                                                       426/112
4,195,951 A  *   4/1980   Finsterwalder ........ B65D 88/78
                                                       114/256

* cited by examiner

200

Manufacture a spherical portion
202

Manufacture a conical portion connected to the spherical portion, the conical portion extending from the spherical portion, the conical portion having an opening for pumping in and pumping out a pressurized gaseous substance
204

PRESSURE VESSEL AND METHOD OF MANUFACTURING THEREOF

TECHNICAL FIELD

This disclosure generally relates to pressure vessels and methods of manufacturing pressure vessels.

BACKGROUND

Pressure vessels are containers configured to hold gases or liquids at a pressure different from the ambient pressure. Pressure vessels can have different shapes and usually include sections of spheres, cylinders, and cones. For example, a pressure vessel may have a spherical shape, a cylindrical shape with hemispherical or dished end caps, a rectangular shape with rounded ends, and so forth.

Conventional vessels for storing liquids or gases under pressure have a sealed outer wall with a valve and an inner supporting structure of the outer wall. Other conventional pressure vessels have a support connection created by a central supporting element inside the outer wall. However, constructing the supporting structures inside the pressure vessels is time-consuming and otherwise complicates the vessel manufacturing process. Additionally, the supporting structures require additional material and occupy space inside the pressure vessels, thereby reducing the space inside the pressure vessels that would otherwise be available for accommodating gases or liquids.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to some embodiments of the disclosure, a pressure vessel is provided. The pressure vessel may include a spherical portion and a conical portion connected to the spherical portion. The conical portion may extend from the spherical portion and have an opening for pumping in and pumping out a pressurized gaseous substance. The pressurized gaseous substance may include one of the following: oxygen gas, helium gas, and nitrogen gas. An angle between a generatrix of the conical portion and a symmetry axis of the conical portion may be between 10 degrees and 50 degrees.

The spherical portion and the conical portion can be made in a single technological cycle. For example, the spherical portion and the conical portion can be made from a powdery substance by an additive manufacturing. The powdery substance may include a nickel-based metal powder for the additive manufacturing.

The spherical portion may have a first portion and a second portion connected to the first portion. The first portion may include a lower hemisphere of the spherical portion. The second portion may include an upper truncated hemisphere of the spherical portion.

The thickness $\delta_1$ of a wall of the first portion of the spherical portion may be constant and may be determined based on a predetermined operating pressure P, a radius $R_1$ of the spherical portion, and an allowable stress $[\sigma]$ of a material of the spherical portion. For example, the thickness $\delta_1$ of the wall of the first portion of the spherical portion may be determined by a formula $$\delta_1 = \frac{PR_1}{2[\sigma]}.$$

The thickness $\delta_{1,2}$ of a wall of the second portion of the spherical portion may change linearly from the thickness $\delta_1$ to a thickness $\delta_2$. The thickness $\delta_2$ can be determined based on the predetermined operating pressure P, a radius $R_2$ of a base of the conical portion, the allowable stress $[\sigma]$, and an angle $\alpha$ between a generatrix of the conical portion and a symmetry axis of the conical portion. For example, the thickness $\delta_2$ of the wall of the second portion of the conical portion can be determined by a formula $$\delta_2 = \frac{\sqrt{3}\, PR_2}{2[\sigma]\cos\alpha}.$$

The thickness $\delta_{2,3}$ of a wall of the conical portion may change linearly from the thickness $\delta_2$ to a thickness $\delta_3$. The thickness $\delta_3$ may be determined based on the predetermined operating pressure P, a radius $R_3$ of the opening of the conical portion, the allowable stress $[\sigma]$, and the angle $\alpha$ between the generatrix of the conical portion and the symmetry axis of the conical portion. For example, the thickness $\delta_3$ of the wall of the conical portion may be determined by a formula $$\delta_3 = \frac{\sqrt{3}\, PR_3}{2[\sigma]\cos\alpha}.$$

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
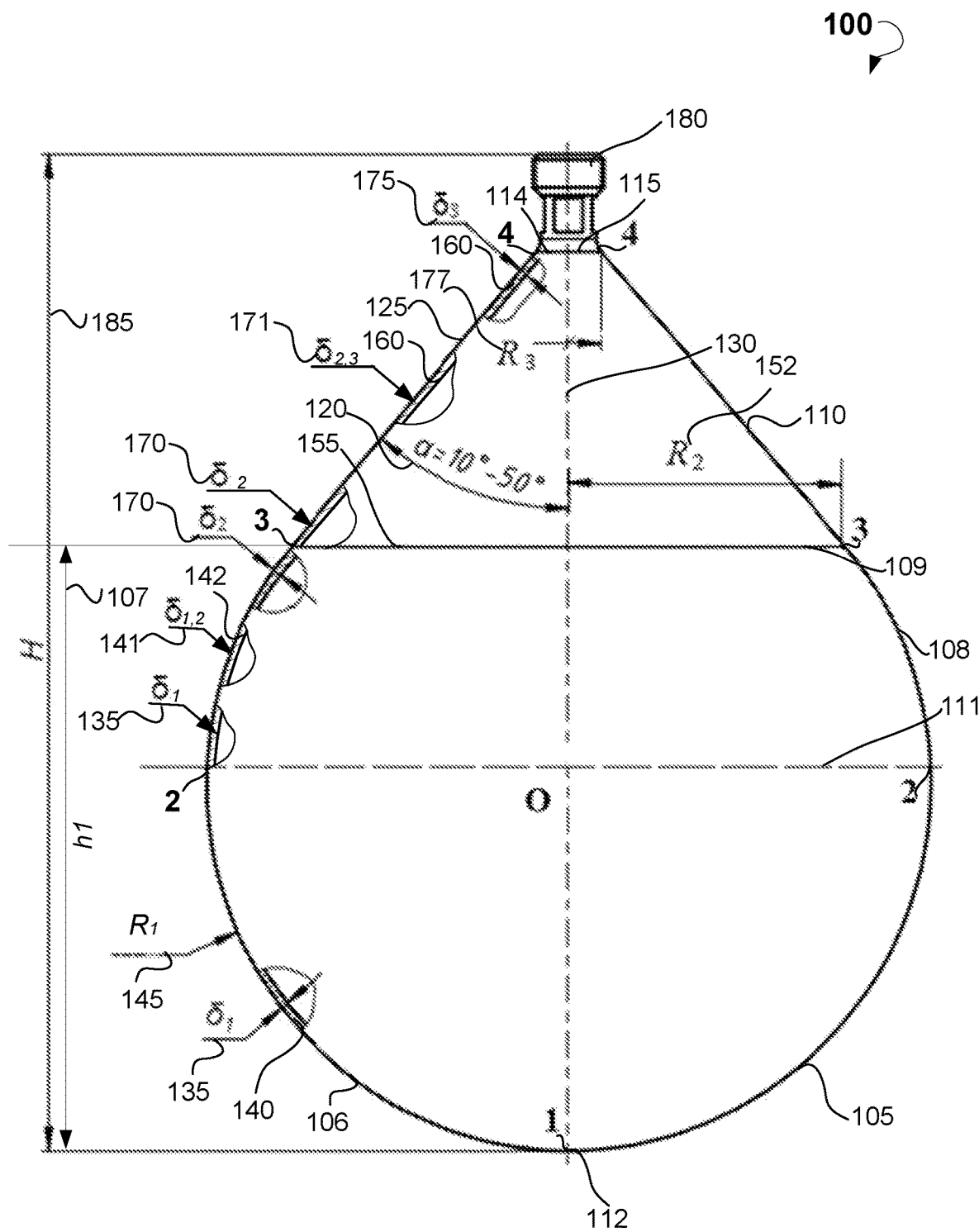
FIG. 1 is a front view of a pressure vessel, according to various example of the present disclosure.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure are concerned with pressure vessels and methods for manufacturing of pressure vessels. The pressure vessels of the present disclosure can be used for storage and transportation of gaseous oxygen, helium, nitrogen, and other gases. The pressure vessels can be used, for example, in space, aviation, and related industries.

In one example embodiment, a pressure vessel of the present disclosure is a unitary drop-shaped article having a spherical portion, a conical portion angled from 10° to 50° degrees, and a variable thickness of walls. Specifically, the pressure vessel may have the spherical portion and the conical portion. The spherical portion may have a first portion and a second portion connected to the first portion. The first portion may include a lower hemisphere of the spherical portion. The second portion may include an upper truncated hemisphere of the spherical portion. The conical portion may connect to the second portion of the spherical portion and extend from the second portion of the spherical portion. The conical portion may have an opening for pumping in and pumping out a pressurized gaseous substance. An angle between a generatrix of the conical portion and a symmetry axis of the conical portion may be between 10 degrees and 50 degrees.

The pressure vessel may have a uniform-strength shell structure. The values of the thickness in each portion of the pressure vessel may be selected based on the principles of the fourth failure theory (also known as the Maximum Distortion Energy Theory, the shear strain energy theory, or von Mises-Hencky theory) and based on equivalent stresses that are equal to the allowable stresses.

In an example embodiment, the thickness of walls of the pressure vessel may vary from a thickness $\delta_1$ to a thickness $\delta_3$. Specifically, the thickness $\delta_1$ of a wall of the first portion of the spherical portion may be constant and determined based on a predetermined operating pressure P, a radius $R_1$ of the spherical portion, and an allowable stress [σ] of a material of the wall of the spherical portion. A thickness $\delta_{1,2}$ of a wall of the second portion of the spherical portion may change linearly from the thickness $\delta_1$ to a thickness $\delta_2$. The thickness $\delta_2$ may be determined based on the predetermined operating pressure P, a radius $R_2$ of a base of the conical portion, the allowable stress [σ] of the material of the spherical portion, and an angle α between a generatrix of the conical portion and a symmetry axis of the conical portion.

A thickness $\delta_{2,3}$ of a wall of the conical portion may change linearly from the thickness $\delta_2$ to the thickness $\delta_3$. The thickness $\delta_3$ may be determined based on the predetermined operating pressure P, a radius $R_3$ of the opening of the conical portion, the allowable stress [σ], and the angle α between the generatrix of the conical portion and the symmetry axis of the conical portion.

Conventional pressure vessels have a sealed outer wall structure with a valve and an inner supporting structure of the outer wall. The inner supporting structure may be in the form of a central supporting element inside the outer wall. The supporting structure may be connected to an inner side of the outer wall. The central supporting element may have a first end for mounting a valve contacting a cavity inside the vessel and a second end to receive central supporting element into the interior of the pressure vessel. Inner supporting structures increase the weight of conventional pressure vessels. Furthermore, additional materials and steps are needed in order to manufacture the inner supporting structures and connect the inner supporting structures to the conventional pressure vessels.

In contrast to the conventional pressure vessels, the pressure vessel of the present disclosure does not include any inner technological supporting structures and, therefore, is lightweight and easier to produce. Moreover, the combination of a spherical portion and a conical portion of the pressure vessel and the thickness selected for the respective walls of the spherical and the conical portions make the structure of the pressure vessel stronger when compared to the conventional pressure vessels.

According to some embodiments of the present disclosure, a method for manufacturing a pressure vessel is provided. The method may include manufacturing a spherical portion and manufacturing a conical portion. The conical portion may be connected to the spherical portion and extend from the spherical portion. The conical portion may have an opening for pumping in and pumping out a pressurized gaseous substance.

The method simplifies the manufacturing of the high-pressure vessel. Specifically, both the spherical portion and the conical portion may be manufactured using an additive manufacturing, also known as three-dimensional (3D) printing. The 3D printing is the process of constructing a 3D object based on a computer-aided design (CAD) model or a digital 3D model using layer-by-layer deposition and sintering of particles of a material (for example, a metal powder) until the 3D object is formed. The selected shape of the pressure vessel (i.e., a combination of a spherical shape and a conical shape) allows the pressure vessel to be manufactured as a single unit. The additive manufacturing is a process that allows varying the thickness of the wall of the pressure vessel, thereby reducing the weight of the pressure vessel and optimizing the rational distribution of the weight of the pressure vessel to ensure the strength characteristics.

Furthermore, in contrast to the conventional pressure vessels, the vessels constructed according to the present disclosure do not require manufacturing any internal or central supporting structural elements inside the pressure vessels.

Besides reducing the weight of the pressure vessel, the method results in a decrease of the manufacturing time (e.g., to 7 days for a 3-liter pressure vessel and operating pressure of 300 kilogram-force per square centimeter ($kgf/cm^2$)), and does not require using complex specialized technological equipment typically used in manufacturing of high-pressure vessels by conventional methods.

Referring now to the drawings, FIG. 1 is a front view of a pressure vessel 100 with partial cross-sectional views, according to various examples of the present disclosure. The pressure vessel 100 may have a spherical portion 105 and a conical portion 110. The spherical portion 105 may include a first portion 106 and a second portion 108. The second portion 108 connects to the first portion 106 along a cross section along an axis line 111. The first portion 106 of the spherical portion 105 may include a lower hemisphere of the spherical portion 105. The second portion 108 of the spherical portion 105 may include an upper hemisphere truncated along a truncation line 109 at a predetermined distance 107 (shown as a distance h1 in FIG. 1) from a bottom 112 of the spherical portion 105.

The conical portion 110 may be connected to the second portion 108 of the spherical portion 105 and extend from the second portion 108 of the spherical portion 105. Specifically, the conical portion 110 may be connected to the second portion 108 of the spherical portion 105 along the truncation line 109 of the spherical portion 105.

The conical portion 110 may have an opening 115 at a top 114 of the conical portion 110 for pumping in and pumping out a pressurized gaseous substance. In an example embodiment, the pressurized gaseous substance may include one of the following: oxygen gas, helium gas, nitrogen gas, and so forth.

The spherical portion 105 and the conical portion 110 may be made in a single technological cycle. In an example embodiment, the spherical portion 105 and the conical portion 110 may be manufactured from a material made from a powdery substance by an additive manufacturing, also known as 3D printing. The 3D printing may include a layer-by-layer deposition and sintering of particles of a powdery substance until a physical object (i.e., the pressure vessel 100) is formed. The deposition and sintering of particles may be performed according to a predetermined CAD model of the pressure vessel 100. The sintering of the powdery substance may involve using a beam of one or more lasers. In the course of 3D printing of the pressure vessel 100, the particles of the powdery substance are deposited layer by layer by depositing a first layer and then sequentially adding further layers onto the first layer. The "growing" of the walls of pressure vessel 100 occurs layer by layer from the bottom 112 of the spherical portion 105 to the top 114 of the conical portion 110 in a single technological cycle. The powdery substance used for manufacturing the spherical portion 105 and the conical portion 110 may include a nickel-based metal powder for the additive manufacturing. In an example embodiment, the nickel-based metal powder is a nickel alloy, for example, a nickel alloy Inconel® 718. Upon completion of the additive manufacturing, the pressure vessel 100 in the form of a unitary article with the spherical portion 105 and the conical portion 110 connected to each other is manufactured.

The equipment used for the additive manufacturing may include a 3D printing device configured to print articles from powdery substances, such as metal-based powdery substances. The sizes and volumes of the pressure vessels produced by the 3D printing device are limited only by the printing area of the 3D printing device. In an example embodiment, the 3D printer EOS400 can be used as the 3D printing device. The 3D printer EOS400 is a 3D printer used for the additive manufacturing of metal parts in industrial production environments.

In the pressure vessel 100, an angle α 120 between a generatrix 125 of the conical portion 110 and a symmetry axis 130 of the conical portion 110 (which is also a symmetry axis of the spherical portion 105) may be between 10 degrees and 50 degrees.

Manufacturing of the pressure vessel 100 by using 3D printing allows varying the thickness of the wall of the pressure vessel 100 from a thickness $\delta_1$ 135 to a thickness $\delta_2$ 170 and then from the thickness $\delta_2$ 170 to a thickness $\delta_3$ 175. In the pressure vessel 100, the thickness $\delta_1$ 135 of a wall 140 of the first portion 106 of the spherical portion 105 may be constant. Specifically, the thickness $\delta_1$ 135 of the wall 140 of the first portion 106 of the spherical portion 105 may be constant from point 1 to point 2 shown in FIG. 1. The thickness $\delta_1$ 135 may be determined based on a predetermined operating pressure P (e.g., a desired operating pressure P for the pressure vessel 100), a radius $R_1$ 145 of the spherical portion 105 (i.e., an outer radius of the spherical portion 105), and an allowable stress [σ] of the material of the spherical portion 105 (i.e., the material of the wall 140). More specifically, the thickness $\delta_1$ 135 of the wall 140 of the first portion 106 of the spherical portion 105 may be determined by the following formula:

$$\delta_1 = \frac{PR_1}{2[\sigma]},$$

where:

P is operating pressure in the pressure vessel 100, MPa;

$R_1$ 145 is a radius of the spherical portion 105 of the pressure vessel 100; and

[σ] is an allowable stress, MPa.

The allowable stress is an upper limit of an operating stress arising under the action of predetermined loads on the pressure vessel 100. The allowable stress is calculated as follows:

$$[\sigma] = \min\left\{\begin{array}{c}\frac{\sigma_B}{2}, \\ \sigma_T\end{array}\right.$$

where:

$\sigma_B$ is an ultimate strength of the material of the pressure vessel 100, MPa (can be found in reference books for the material of the pressure vessel 100); and $\sigma_T$ is an yield strength of the material of the pressure vessel 100, MPa (can be found in reference books for the material of the pressure vessel 100).

A thickness $\delta_{1,2}$ 141 of a wall 142 of the second portion 108 of the spherical portion 105 may change linearly from the thickness $\delta_1$ 135 to the thickness $\delta_2$ 170. Specifically, the thickness $\delta_{1,2}$ 141 of the wall 142 of the second portion 108 of the spherical portion 105 may change linearly from the thickness $\delta_1$ 135 in point 2 to the thickness $\delta_2$ 170 in point 3 shown in FIG. 1.

The thickness $\delta_2$ 170 may be determined by the following formula:

$$\delta_2 = \frac{\sqrt{3}\,PR_2}{2[\sigma]\cos\alpha},$$

where:

P is an operating pressure in the pressure vessel 100, MPa;

$R_2$ 152 is a radius of a base 155 of the conical portion 110 of the pressure vessel 100;

[σ] is an allowable stress, MPa;

α is an angle between a generatrix of the conical portion 110 and the symmetry axis 130 of the conical portion 110; and in point 3, $R_2 = R_1 \cos \alpha$.

As $$\delta_2 = \frac{\sqrt{3}\,PR_2}{2[\sigma]\cos\alpha}$$

and, in point 3, $R_2=R_1 \cos \alpha$, the thickness $\delta_2$ 170 may be also determined by a formula:

$$\delta_2 = \frac{\sqrt{3} \, PR_1}{2\,[\sigma]},$$

where:

P is the operating pressure in the pressure vessel 100, MPa;

$R_1$ 145 is a radius of the spherical portion 105 of the pressure vessel 100; and

[σ] is an allowable stress, MPa.

A thickness $\delta_{2,3}$ 171 of a wall 160 of the conical portion 110 may change linearly from the thickness $\delta_2$ 170 to the thickness $\delta_3$ 175. Specifically, the thickness $\delta_{2,3}$ 171 of the wall 160 of the conical portion 110 may change linearly from the thickness $\delta_2$ 170 in point 3 to the thickness $\delta_3$ 175 in point 4 shown in FIG. 1.

The thickness $\delta_3$ 175 may be determined based on the predetermined operating pressure P, a radius $R_3$ 177 of the opening 115 of the conical portion 110, the allowable stress [σ], the angle α 120 between the generatrix 125 of the conical portion 110, and the symmetry axis 130 of the conical portion 110.

The thickness $\delta_3$ 175 of the wall 160 of the conical portion 110 may be determined by a formula $$\delta_3 = \frac{\sqrt{3} \, PR_3}{2[\sigma]\cos \alpha},$$

where:

P is the operating pressure in the pressure vessel 100, MPa;

$R_3$ 177 is a radius of the opening 115 of the conical portion 110 of the pressure vessel 100;

[σ] is an allowable stress, MPa; and

α is an angle between the generatrix 125 of the conical portion 110 and the symmetry axis 130 of the conical portion 110.

In an example embodiment, $R_2$ 152 is an intermediate radius between the spherical portion 105 and the conical portion 110 and provides a smooth transition of the thickness of the wall from the spherical portion 105 to the conical portion 110.

The pressure vessel 100 may further have a pressure valve 180 connected to the top 114 of the conical portion 110. The height of the pressure vessel 100 with the pressure valve 180 is shown in FIG. 1 as height H 185.

The pressure vessel 100 manufactured in accordance with the dimensions shown in FIG. 1 by the method described with reference to FIG. 2 below has been tested for strength, tightness, and effect of cyclic loads, as well as subjected to a fracture test. The tests have confirmed that the pressure vessel 100 has the predetermined strength characteristics.

In an example embodiment, the thickness of the wall in each portion along points 1, 2, 3, and 4 of the pressure vessel 100 may be calculated based on performing a numerical simulation of the thickness of the wall of the pressure vessel 100. The technological limitations peculiar to the Selective Laser Melting technology of the 3D printing need to be fulfilled in the course of the numerical simulation.

Thus, the thickness of the wall of the pressure vessel 100 may change along points 1, 2, 3, and 4 from the thickness $\delta_1$ 135 in point 1 to the thickness $\delta_3$ 175 in point 4. Specifically, the thickness $\delta_1$ 135 may be constant from point 1 to point 2, the thickness $\delta_1$ 135 in point 2 may change linearly to the thickness $\delta_2$ 170 in point 3, and the thickness $\delta_2$ 170 in point 3 may change linearly to the thickness $\delta_3$ 175 in point 4.

Figure 2:
FIG. 2 is a flow chart of a method for manufacturing a pressure vessel, according to some example embodiments of the present disclosure.

FIG. 2 is a flow chart of a method 200 for manufacturing a pressure vessel, according to some example embodiments of the present disclosure. Notably, the method 200 may have additional steps not shown herein, but which can be evident to those skilled in the art from the present disclosure.

The method 200 may commence in block 202 with manufacturing a spherical portion and continue with manufacturing a conical portion connected to the spherical portion, as shown in block 204. The conical portion may extend from the spherical portion. The conical portion may have an opening for pumping in and pumping out a pressurized gaseous substance. The pressurized gaseous substance may include one of the following: oxygen gas, helium gas, nitrogen gas, and so forth.

In an example embodiment, an angle between a generatrix of the conical portion and a symmetry axis of the conical portion may be between 10 degrees and 50 degrees. The spherical portion and the conical portion can be made in a single technological cycle. The spherical portion and the conical portion can be made from a powdery substance using an additive manufacturing. The powdery substance may include a nickel-based metal substance for the additive manufacturing.

The spherical portion may have a first portion and a second portion connected to the first portion. The first portion may include a lower hemisphere of the spherical portion. The second portion may include an upper truncated hemisphere of the spherical portion.

The thickness $\delta_1$ of a wall of the first portion of the spherical portion may be constant and determined based on a predetermined operating pressure P, a radius $R_1$ of the spherical portion, and an allowable stress [σ] of a material of the spherical portion. For example, the thickness $\delta_1$ of the wall of the first portion of the spherical portion may be determined by the formula $$\delta_1 = \frac{PR_1}{2\,[\sigma]}.$$

The thickness $\delta_{1,2}$ of a wall of the second portion of the spherical portion may change linearly from the thickness $\delta_1$ to a thickness $\delta_2$. The thickness $\delta_2$ can be determined based on the predetermined operating pressure P, a radius $R_2$ of a base of the conical portion or the radius $R_1$ of the spherical portion, the allowable stress [σ], and an angle α between a generatrix of the conical portion and a symmetry axis of the conical portion. For example, the thickness $\delta_2$ of the wall of the second portion of the conical portion can be determined by a formula $$\delta_2 = \frac{\sqrt{3} \, PR_2}{2\,[\sigma]\cos \alpha}$$

or by a formula $$\delta_2 = \frac{\sqrt{3} \, PR_1}{2\,[\sigma]}$$

The thickness $\delta_{2,3}$ of a wall of the conical portion may change linearly from the thickness $\delta_2$ to a thickness $\delta_3$. The thickness $\delta_3$ may be determined based on the predetermined operating pressure P, a radius $R_3$ of the opening of the conical portion, the allowable stress $[\sigma]$, and the angle $\alpha$ between the generatrix of the conical portion and the symmetry axis of the conical portion. For example, the thickness $\delta_3$ of the wall of the conical portion may be determined by a formula $$\delta_3 = \frac{\sqrt{3}\,PR_3}{2[\sigma]\cos\alpha}.$$

Thus, a pressure vessel and a method for manufacturing the pressure vessel are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A pressure vessel comprising:
   a spherical portion; and
   a conical portion connected to the spherical portion, the conical portion extending from the spherical portion, the conical portion having an opening for pumping in and pumping out a pressurized gaseous substance.

2. The pressure vessel of claim 1, wherein an angle between a generatrix of the conical portion and a symmetry axis of the conical portion is between 10 degrees and 50 degrees.

3. The pressure vessel of claim 1, wherein the spherical portion and the conical portion are manufactured in a single technological cycle.

4. The pressure vessel of claim 1, wherein the spherical portion and the conical portion include a material made from a powdery substance by three-dimensional (3D) printing.

5. The pressure vessel of claim 4, wherein the powdery substance includes a nickel-based metal powder for the 3D printing.

6. The pressure vessel of claim 1, wherein:
   the spherical portion includes a first portion and a second portion, wherein the first portion of the spherical portion is a lower hemisphere of the spherical portion and the second portion of the spherical portion is an upper truncated hemisphere of the spherical portion; and
   a thickness ($\delta_1$) of a wall of the first portion of the spherical portion is determined based on a predetermined operating pressure (P), a radius ($R_1$) of the spherical portion, and an allowable stress ($[\sigma]$) of a material of the spherical portion.

7. The pressure vessel of claim 6, wherein the thickness ($\delta_1$) of the wall of the first portion of the spherical portion is determined using a formula $$\delta_1 = \frac{PR_1}{2[\sigma]}.$$

8. The pressure vessel of claim 6, wherein:
   a thickness ($\delta_{1,2}$) of a wall of the second portion of the spherical portion changes linearly from the thickness ($\delta_1$) to a second thickness ($\delta_2$); and
   the second thickness ($\delta_2$) is determined based on the predetermined operating pressure (P), a radius ($R_2$) of a base of the conical portion, the allowable stress ($[\sigma]$) of the material of the spherical portion, and an angle ($\alpha$) between a generatrix of the conical portion and a symmetry axis of the conical portion.

9. The pressure vessel of claim 8, wherein the second thickness ($\delta_2$) of the wall of the second portion of the spherical portion is determined using a formula $$\delta_2 = \frac{\sqrt{3}\,PR_2}{2[\sigma]\cos\alpha},$$

where $R_2 = R_1 \cos\alpha$.

10. The pressure vessel of claim 8, wherein a thickness ($\delta_{2,3}$) of a wall of the conical portion changes linearly from the second thickness ($\delta_2$) to a third thickness ($\delta_3$), wherein the third thickness ($\delta_3$) is determined based on the predetermined operating pressure (P), a radius ($R_3$) of the opening of the conical portion, the allowable stress ($[\sigma]$), and the angle ($\alpha$) between the generatrix of the conical portion and the symmetry axis of the conical portion.

11. The pressure vessel of claim 10, wherein the third thickness ($\delta_3$) of the wall of the conical portion is determined by a formula $$\delta_3 = \frac{\sqrt{3}\,PR_3}{2[\sigma]\cos\alpha}.$$

12. The pressure vessel of claim 1, wherein the pressurized gaseous substance includes one of the following: oxygen gas, helium gas, and nitrogen gas.

13. A method for manufacturing a pressure vessel, the method comprising:
    manufacturing a spherical portion; and
    manufacturing a conical portion connected to the spherical portion, the conical portion extending from the spherical portion, the conical portion having an opening for pumping in and pumping out a pressurized gaseous substance.

14. The method of claim 13, wherein an angle between a generatrix of the conical portion and a symmetry axis of the conical portion is between 10 degrees and 50 degrees.

15. The method of claim 13, wherein the spherical portion and the conical portion are manufactured in a single technological cycle.

16. The method of claim 13, wherein the spherical portion and the conical portion are made from a powdery substance by three-dimensional (3D) printing.

17. The method of claim 13, wherein:
    the spherical portion includes a first portion and a second portion, wherein the first portion of the spherical portion is a lower hemisphere of the spherical portion and the second portion of the spherical portion is an upper truncated hemisphere of the spherical portion;
    a thickness ($\delta_1$) of a wall of the first portion of the spherical portion is determined based on a predetermined operating pressure (P), a radius ($R_1$) of the spherical portion, and an allowable stress ($[\sigma]$) of a material of the spherical portion; and the thickness ($\delta_1$) of the wall of the first portion of the spherical portion is determined using a formula $$\delta_1 = \frac{PR_1}{2[\sigma]}.$$

18. The method of claim 17, wherein:

a thickness ($\delta_{1,2}$) of a wall of the second portion of the spherical portion changes linearly from the thickness ($\delta_1$) to a second thickness ($\delta_2$);

the second thickness ($\delta_2$) is determined based on the predetermined operating pressure (P), a radius ($R_2$) of a base of the conical portion, the allowable stress ($[\sigma]$) of the material the spherical portion, and an angle ($\alpha$) between the generatrix of the conical portion and a symmetry axis of the conical portion; and the second thickness ($\delta_2$) of the wall of the second portion of the spherical portion is determined by a formula $$\delta_2 = \frac{\sqrt{3}\,PR_2}{2[\sigma]\cos\alpha}.$$

where $R_2 = R_1 \cos\alpha$.

19. The method of claim 18, wherein a thickness ($\delta_{2,3}$) of a wall of the conical portion changes linearly from the second thickness ($\delta_2$) to a third thickness ($\delta_3$), wherein the third thickness ($\delta_3$) is determined based on the predetermined operating pressure (P), a radius ($R_3$) of the opening of the conical portion, the allowable stress ($[\sigma]$), and the angle ($\alpha$) between the generatrix of the conical portion and the symmetry axis of the conical portion.

20. The method of claim 19, wherein the third thickness ($\delta_3$) of the wall of the conical portion is determined by a formula $$\delta_3 = \frac{\sqrt{3}\,PR_3}{2[\sigma]\cos\alpha}.$$

* * * * *